Feb. 8, 1966 J. W. SCOTT 3,233,981
APPARATUS FOR CONTACTING DISSIMILAR PHASES
Filed Sept. 25, 1961 2 Sheets-Sheet 1

INVENTOR
JOHN W. SCOTT
BY
ATTORNEYS

Feb. 8, 1966        J. W. SCOTT        3,233,981
APPARATUS FOR CONTACTING DISSIMILAR PHASES
Filed Sept. 25, 1961        2 Sheets-Sheet 2

INVENTOR
JOHN W. SCOTT
BY
ATTORNEYS

United States Patent Office 3,233,981
Patented Feb. 8, 1966

3,233,981
APPARATUS FOR CONTACTING DIS-
SIMILAR PHASES
John W. Scott, Ross, Calif., assignor to Chevron Research
Company, San Francisco, Calif., a corporation of
Delaware
Filed Sept. 25, 1961, Ser. No. 141,941
7 Claims. (Cl. 23—285)

This application is a continuation-in-part of my application Serial No. 419,993, filed March 31, 1954, now abandoned.

The present invention relates to apparatus for contacting a fluid phase with a fluidized solid particulate material phase, and more particularly relates to apparatus for contacting such dissimilar phases in a reaction vessel wherein the contacting is effected by simultaneously flowing these phases through different portions of a horizontal velocity-modifying means dividing said vessel into a plurality of vertically disposed mixing or reaction zones. The invention has for an object the provision of an improved apparatus for uniformly and controllably flowing a solid particulate and a fluid phase through a plurality of reaction zones by providing preferential flow passageways for the solid phase through some of said passageways and the fluid phase through other passageways.

In countercurrent contacting of liquids and fluidized, particulate solids such as in refining petroleum stocks by adsorption or fluid catalytic reaction processes, it is desirable to maintain the particles as small as possible for the most effective contacting of the liquid with the particles. By maintaining these particles quite small, it is possible to obtain the desired contacting at quite high fluid velocities, thereby permitting rapid treatment of the liquid. While it has been proposed heretofore to carry on such fluidized reactions in columns containing bubble plates and downcomers, bubble plates contain relatively flat surfaces on which solid particulate material has a tendency to classify and settle out. In Hall et al. 2,471,-064, it has been proposed to use a modified bubble cap arrangement which includes a plurality of unobstructed chimneys mounted in circular openings in a tray. Even though equally spaced around the tray, such structure permits relatively uneven flow across the tray, since the flow as readily occurs through the openings in which the chimneys are mounted as through the chimneys, and no preferential velocity change occurs in the center of the passageways to insure stability of flow of the phases therethrough.

Under normal conditions in such previously known apparatus, it has been found very difficult to maintain hydrodynamic stability of flow. This is because individual passageways, such as downcomers in conventional bubble trays, or chimneys of the type shown by Hall et al. in U.S. Patent 2,471,064, if blown clear of particulate phase by local disturbance, do not readily return to their previous and desired mode of operation as do the uniform and preferential flow passageways of the present invention. In addition, previously known apparatus for staging such contacting processes involve substantial reduction of available cross section at each stage, as with grids, and tend to classify the particulate phase by particle size. A consequence, aside from entrainment of smaller particles, is a disproportionately long residence time of smaller particles in the apparatus, and the complementary tendency for larger particles to "short circuit" through more rapidly. In apparatus of the type disclosed herein, on the other hand, there is provided a system wherein the fluidized solid material may be successfully staged from reaction zone to reaction zone within the vessel while counterflow of the solid material is facilitated, with much less tendency for classification.

In a preferred form of the invention, improved division of a contacting vessel into distinct mixing and velocity-modifying zones is made possible by the provision of a splitting zone having vertical passageways uniformly spaced horizontally across the contacting space to permit preferential passage of the solid phase through one portion of the velocity-modifying zone. Simultaneously, the fluid phase is preferentially passed through another portion of the velocity-modifying zone. In said preferred form of the invention, there is provided a plurality of passageway means, of which substantially half include a central portion that is larger in cross-sectional area than either of the ends thereof to permit preferentially downward flow of the solid phase. The remaining half of the passageway means have a central portion that is smaller in cross-sectional area than either of the ends thereof to permit preferential upward flow of the fluid phase. All of said passageway means are substantially unobstructed in their communication between the adjacent upper and lower mixing zones. Further, these passageway means are formed as elongated slots substantially parallel to each other and extending across the width of the velocity-modifying zone. Means may be provided for varying the ratio of the passageways of larger cross-sectional area through the central portion thereof to those passageway means of smaller cross-sectional area through the center to permit ease of adjustment of the upward and downward flow phases through the velocity-modifying zone. This adjustment is variable to accommodate the reaction, or contacting, process being performed in the apparatus.

Further objects and advantages of the present invention will become apparent from the following detailed description of the apparatus and its mode of operation, as illustrated in the accompanying drawings which form an integral part of the present specification.

Figure 1:
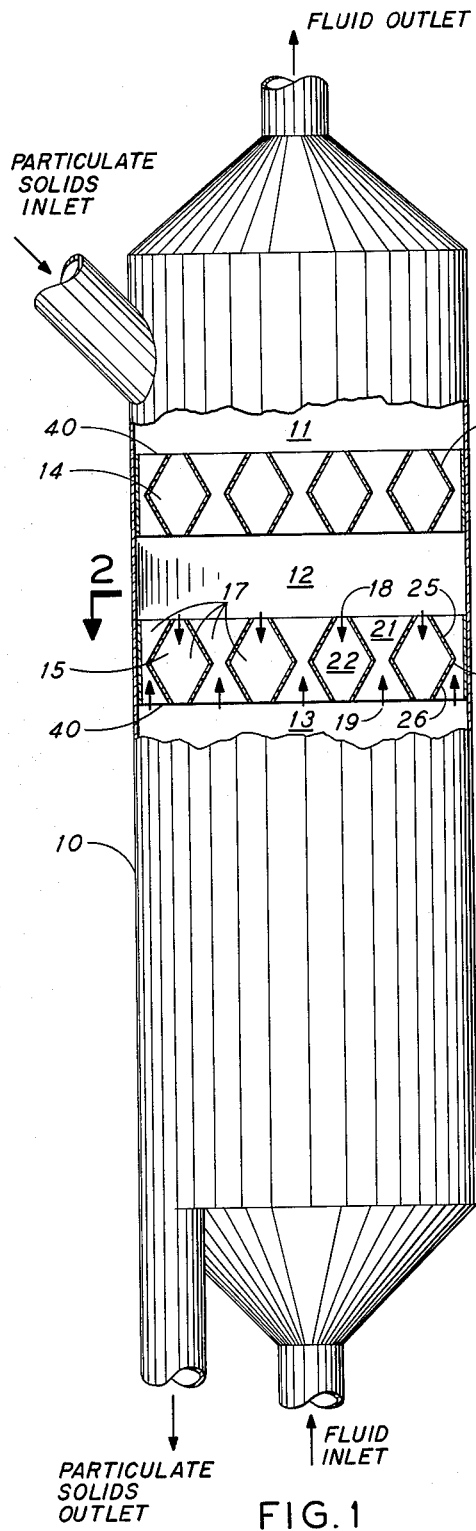
FIG. 1 is a side elevation view of a contacting vessel in which the present invention has been incorporated, and particularly illustrates the arrangement of the velocity-modifying or staging means therein.

Referring now to the drawings, and in particular to FIG. 1, there is illustrated a contacting, or reaction, vessel 10 which is desirably separated into vertically disposed contacting zones identified as 11, 12, and 13 that are spaced apart by velocity-modifying or staging means indicated generally as 14 and 15.

In accordance with the present invention, these velocity-modifying means 14 and 15 comprise a ring mounting member 40 and horizontal bar members 16 spaced apart to provide passageway means 17 through vertically spaced staging means 14 and 15 which are substantially unobstructed. As shown, the horizontally extending bar members 16 are arranged in each stage to provide alternate flow paths through vertical passageways 17, some of which, such as passageways 22, are substantially larger in area in their center portions, while the other passageways 21 are substantially smaller in cross-sectional area at their centers. As illustrated by the arrows 18, the passageway means 22 provide a preferential downward passageway for the denser of the two phases being reacted or contacted into vessel 10. Arrows 19 through the passageways 21 of smaller central cross-sectional area indicate the direction of preferential flow of the lighter of the two phases as being in an upward direction through the staging means 15.

This preferential flow in both the upward and downward directions provides a stability of hydrodynamic flow through the reaction vessel 10 by permitting the denser, particulate solid phase to be staged downwardly from one reaction zone, such as 12, into reaction zone 13 by providing a preferential passageway straight through the zone. In accordance with the present invention, passageways 22 form such a preferential path for downward flow of the solid phase by the elongated, parallel passageways 22, having greater dimensions in their center portions than at both the upper and lower ends. In the system illustrated, this preferential downward flow is achieved by deceleration of the upward flowing, lighter fluid phase due to the increased area at the center of passageways 22. At the same time the fluid phase is preferentially flowing upwardly through staging means 15 through passageways 21 due to acceleration of the upward flow by passage through the restricted area in the center of flow paths 21. Thus, there is provided through substantially half of each velocity modifying means 14 and 15 relative downward movement of the solid phase by the increase in the cross-sectional area through the center of some of passageways 17, while relative upward movement of the fluid phase is occurring in the other half of the passageway means through their smaller central cross-sectional areas. In this way, the denser phase will be preferentially buoyed up through those center portions of smaller cross-sectional area identified as 21, but will preferentially settle through those portions of wider cross-sectional dimension identified as 22. Preferably, the passageways 16 and 21 are substantially equal in their average cross-sectional areas across velocity modifying means 14 or 15.

Figure 2:
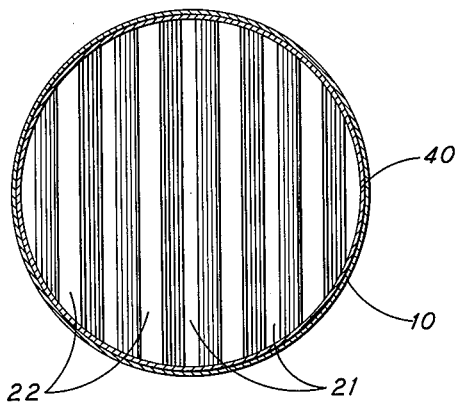
FIG. 2 is a cross-sectional view of the contacting vessel of FIG. 1 taken in the direction of the arrows 2—2.

In accordance with one form of the invention, as illustrated in FIGS. 1 and 2, these preferential passageway means are defined as elongated slots by the transversely extending bar members 16 being formed with a pair of faces or sidewalls, including upper face 25 and lower face 26. The faces are angularly disposed with respect to each other so that the included angle therebetween is somewhat greater than about 90 degrees. As shown, adjacent members 16 are disposed so that the apices are directly adjacent each other. In this way, center portions 21 and 22 are, respectively, narrower than the upper and lower end portions of the passageway means in which they are included, and wider than the ends. Desirably, the passageways 22 have a configuration such that the upper end is slightly smaller than the lower end and the center portion is about double the area of the ends. Passageways 21, on the other hand, are preferably slightly larger at their upper ends than at the lower ends, with the center being about one-half the area of the ends. However, the average areas along the vertical of both passageways 21 and 22 are nearly equal.

Figure 3:
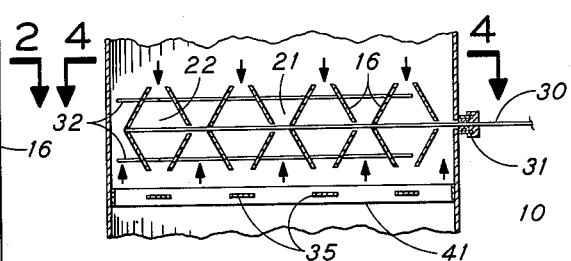
FIG. 3 is an alternative arrangement of the velocity-staging means disclosed in FIGS. 1 and 2, and particularly illustrates the means for adjusting the dimensions of the vertical passageways therethrough.
Figure 4:
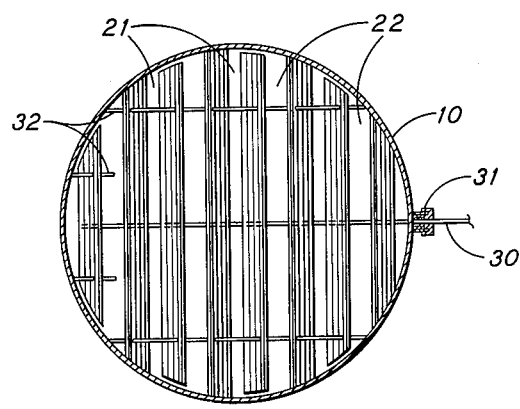
FIG. 4 is a plan view taken in the directions of arrows 4—4 in FIG. 3.

In accordance with an alternative form of the present invention, provision is made for adjusting the central dimensions of the passageway means through the velocity modifying means by joining together alternate transversely extending bar members 16, as particularly shown in FIGS. 3 and 4. In this arrangement, an ajusting bar 30, having affixed thereto the alternate bar members 16, passes through the side of reaction chamber 10 by way of packing gland 31. In this way, the central dimension of the slots 22 of greater center cross-sectional area may be reduced or increased in size with a corresponding simultaneous variation in the center dimension of passageways 21 of smaller cross-sectional area. This adjustability of the passageway means which preferentially pass the denser and less dense phases in the reaction chamber is highly desirable when the conditions of treatment are changed or the same reaction vessel is employed in different contacting processes. Two such systems are adsorption contacting and catalytic refining of petroleum stocks.

While the arrangement of the present adjusting mechanism has been illustrated as a simple bar arrangement for hand adjustment, it is to be understood that such adjustment may be made by suitable mechanism for remote control of the location of the bar members in the velocity-modifying means from the exterior of the vessel. It will also be understood that bar 30 is desirably of minimum dimensions to avoid disturbing the flow paths greatly and to prevent holdup of the solid phase thereon.

As an alternative, or in addition to adjustment by horizontal movement of alternate bars, the relation between top and bottom areas may be altered by a slight rotational adjustment of bars about their longitudinal axes. It will also be understotod that the adjustment of the openings in the various velocity-modifying means throughout the vertical length of the contacting vessel 10 may be adjusted either simultaneously or individually depending upon the process being performed in the vessel or process conditions at a particular point or level in the vessel. As also shown in FIG. 3, deflector members 35 supported by ring 41 may be positioned directly below the lower opening in passageway means 22 of greater cross-sectional area for the purpose of preventing sudden disturbances in the upward flowing fluid, such as a surge of gas or high-velocity fluid, from stripping the downwardly flowing denser material from those passageways. While, in general, the relative upward flow may be adjusted for normal steady-state conditions so that such upward flow in the reaction vessel will permit the controlled settling of the denser medium through passageways 22, it is desirable to reduce the tendency for localized surge conditions to temporarily affect the smooth functioning of the velocity-modifying means. To this end, the deflector members 35 provide a circuitous path for further decelerating upward fluid flow under a given flow condition through passageways 22.

Figure 5:
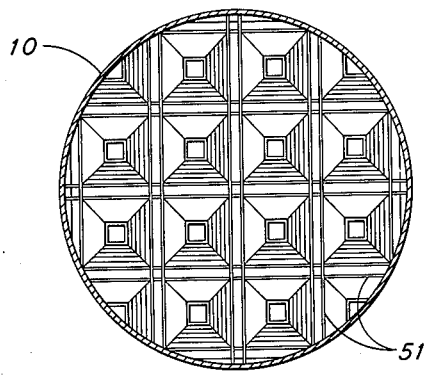
FIG. 5 is a plan view similar to views 2 and 4, illustrating an alternative arrangement for the velocity-modifying means in which the passageway means are defined by oppositely disposed pairs of frustopyramidal shells.
Figure 6:
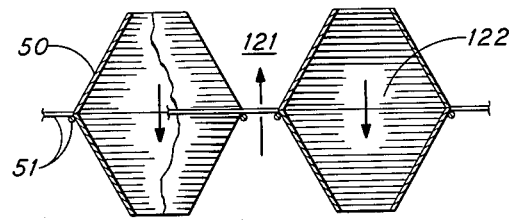
FIG. 6 is a side elevation view of a portion of the frustopyramidal shells illustrated in FIG. 5.

Referring now to the arrangement illustrated in FIGS. 5 and 6, there is shown an alternative form of the present invention for providing a plurality of velocity modifying passageways through the contacting vessel wherein some of the passageways permit preferential upward flow of a fluid phase while the remainder of the passageways permit preferential downward flow of the solid phase. In the arrangement of FIGS. 5 and 6, these passageways are provided by a plurality of truncated pyramidal shell members, identified as 50, which will be supported upon transversely extending rod members 51 arranged in grid-like pattern to support the center portions of the individual shell members in substantially parallel and vertical positions in the velocity-modifying means. As shown, the apices of these pyramids are directed away from each other and the bases of the two truncated pyramids connected together to form a preferential downward flow path through the center of the shell members while the preferential upward flow path is through the space between the shell members. The rods 51 are again desirably of minimum width to prevent disturbance of the flow paths.

The term "preferential," as used in description of the upward flow path through the shell members in FIGS. 5 and 6, is intended to set forth that both the fluid and solid phases pass through both the accelerating channels and decelerating channels or passageways. However, it will be apparent that the relative amounts and relative rates of flow through these accelerating and decelerating channels will be different. Likewise, the direction of flow of the solid phase under certain treating conditions may be such that the superficial velocity of that phase through the splitting zones is in an upward direction, but by virtue of the difference in relative flow rates through the accelerating and decelerating zones, the solid phase will flow at a lesser rate through the passageways of enlarged central section than through the passageways of reduced central cross section.

Figure 7:
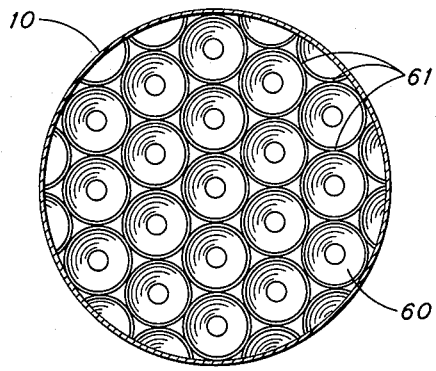
FIG. 7 is a further modification of the arrangement shown in FIG. 5 and particularly illustrates the velocity-modifying means as being constructed of pairs of frustoconical shells in which the apices of each pair of shells are directed toward each other.
Figure 8:
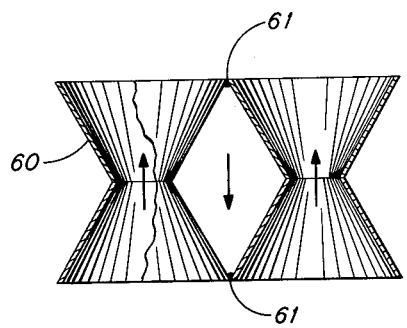
FIG. 8 is a side elevation of the frustoconical shells from which the velocity-modifying means is constructed in FIG. 7.

There is shown in FIGS. 7 and 8 a further modification of the passageway means in accordance with the present invention. As illustrated, the upward and downward passageways through the velocity-modifying means in a contacting vessel are defined by conical shell members 60 welded together, as by the weld 61, at the points where their bases are in abutting relation with each other. Desirably, conical shells 60 are constructed as two frustoconical members connected together so that their apices are directed toward each other and their bases welded together, as particularly shown in FIG. 8. With the construction shown, the preferential upward flow of the less dense phase is through the center of the conical shell member 60, through passageways 121, while the preferential downward flow of the denser phase is through the space between the shell members, designated as passageways 122. By this arrangement, it will be understood that the downward flow passageways 122 have a central portion which is substantially larger in area than the ends of the passageways, while the upward flow passageways 121 are substantially smaller in the central section than at either of their ends.

Figure 9:
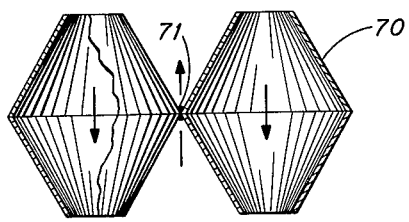
FIG. 9 illustrates an alternative construction of the frustoconical shells which may be used in the arrangement of FIG. 7 but in which the apices of the pairs of cones are directed away from each other.

There is shown in FIG. 9 a further alternative arrangement of the frustoconical shell members, which are identified generally as 70. These shells may be positioned in the same manner as the conical shell members illustrated in FIG. 7. The primary distinction between the arrangements of FIG. 7 and FIG. 9 will be noted to be that the downward flow path in the FIG. 9 arrangement will be through the center of the frustoconical elements 70, while the upward flow will be through the space between the shell members. With the arrangement of FIG. 9, the velocity-modifying member for the reaction vessel is formed by welding the individual shells 70 together at their largest diameters. This is identified in the drawing as weld 71.

In operation of the arrangement shown in FIGS. 1 to 9, it will be understood that the exact dimensions of the flow passages 21 and 22, FIGS. 1 to 4, or 121 and 122, FIGS. 5 to 9, will be determined by the nature of the processes being carried on in the reaction vessel.

While various modifications and changes in the present invention will become apparent to those skilled in the art from the foregoing detailed description, all such modifications and changes which fall within the scope of the appended claims are intended to be included therein.

I claim:

1. Apparatus for contacting a fluid phase with a solid particulate material phase comprising
   (a) a reactor forming a contacting space for both of said phases,
   (b) means for introducing the fluid phase into the lower portion of said reactor and the solid particulate material phase into the upper portion of said reactor,
   (c) a plurality of vertically spaced velocity-modifying means dividing said reactor into a plurality of vertically separated mixing zones,
   (d) each of said velocity-modifying means consisting of a plurality of horizontally aligned flow dividing means, each of which consists essentially of
      (1) superposed upper and lower wall means,
      (2) one of said wall means having horizontally opposed portions diverging upwardly and the other of said wall means having horizontally opposed portions converging upwardly, and
      (3) said flow dividing means being horizontally aligned, with the tops of the lower wall means thereof being aligned at substantially the same elevation and the bottoms of the upper wall means thereof being aligned at substantially the same elevation so as to form a plurality of horizontally aligned and alternating first and second passageways extending across the interior of said reactor, with all of said passageways having top and bottom openings permitting generally vertical flow therethrough, with those of said openings which are below mixing zones communicating directly with the lower portions of such mixing zones and those of said openings which are above mixing zones communicating directly with the upper portions of such mixing zones, and with said first passageways being diverging and then converging in a vertically upward direction and said second passageways being converging and then diverging in a vertically upwardly direction so as to establish preferential flow paths for contacting said phases whereby said fluid phase tends to preferentially flow through said second passageways and said solid particulate material phase tends to preferentially flow through said first passageways,
   (e) first outlet means for said fluid phase disposed above said velocity-modifying means, and
   (f) second outlet means for said solid particulate material phase disposed below said velocity-modifying means.

2. Apparatus for improving the adsorption of materials from a fluid phase onto solid particles comprising
   (a) a reactor forming staged contacting spaces for said fluid and said particles,
   (b) means for introducing said fluid into the lower portion of said reactor and the solid particles into the upper portion of said reactor,
   (c) means forming a plurality of vertically spaced staging zones, each of said staging zones being vertically separated by mixing zones along the length of said reactor, each of said staging zones consisting essentially of
   (d) a plurality of uniformly spaced, continuous passageways of substantially equal length extending entirely therethrough,
   (e) half of said staging zone consisting of
      (1) means forming first passageways having reduced cross-sectional areas of substantially equal cross-sectional areas at their upper and lower ends and
      (2) the central portion thereof having enlarged cross-sectional areas relative to said ends, and
      (3) said central portions of said first passageways being substantially equal in cross-sectional area and at the same level,
   (f) the remainder of said staging zone consisting of
      (1) second passageways having enlarged upper and lower ends of substantially equal cross-sectional areas and
      (2) the central portion thereof having a decreased cross-sectional area relative to said ends, and
      (3) said central portions of said second passageways being substantially equal in cross-sectional area and at the same level
   (g) with all of said passageways having top and bottom openings permitting generally vertical flow therethrough, with those of said openings which are below mixing zones communicating directly with the lower portions of such mixing zones and those of said openings which are above mixing zones communicating directly with the upper portions of such mixing zones, whereby stable preferential flow is established in each of said stages with said solid particulate material preferentially flowing through said first passageways having enlarged cross-sectional areas in their centers and said fluid phase preferentially passing through said second passageways having a reduced cross-sectional area in their centers, (h) first outlet means for said fluid phase disposed above said staging zones, and (i) second outlet means for said solid particles disposed below said staging zones.

3. Apparatus for improving the contacting of materials from a fluid phase with solid particles comprising
  (a) a reactor forming staged contacting spaces for said fluid and said particles,
  (b) means for introducing said fluid into the lower portion of said reactor and the solid particles into the upper portion of said reactor,
  (c) means forming a plurality of vertically spaced velocity-modifying means,
  (d) each of said velocity-modifying means being vertically separated by mixing zones along the length of said reactor,
  (e) each of said velocity-modifying means extending across the transverse area of said reactor and consisting of
  (f) a plurality of uniformly spaced, and continuous passageways of substantially equal length extending entirely therethrough,
    (1) a first plurality of said passageways having reduced cross-sectional areas at their upper and lower ends and
    (2) the centers of said first plurality of passageways having substantially equal cross-sectional areas that are relatively enlarged as compared to said ends, and
    (3) the remainder of said plurality of passageways having enlarged upper and lower ends and
    (4) the centers of said remainder of said plurality of passageways having substantially equal cross-sectional areas that are relatively decreased as compared to said ends,
  (g) with all of said passageways having top and bottom openings permitting generally vertical flow therethrough, with those of said openings which are below mixing zones communicating directly with the lower portions of such mixing zones and those of said openings which are above mixing zones communicating directly with the upper portions of such mixing zones, whereby stable preferential flow is established in each of said stages with said solid particulate material preferentially flowing through said first passageways having enlarged cross-sectional areas in their centers and said fluid phase preferentially passing through said second passageways having a reduced cross-sectional area in their centers,
  (h) first outlet means for said fluid phase disposed above said velocity-modifying means, and
  (i) second outlet means for said solid particles disposed below said velocity-modifying means.

4. Apparatus in accordance with claim 3 in which said first plurality of said passageways are formed by a pair of sidewalls inclined to the vertical and each pair of said sidewalls are joined at an apex with one of said sidewalls inclined outwardly and the other of said sidewalls inclined inwardly.

5. Apparatus in accordance with claim 4 in which each of said sidewalls is an elongated plate extending transversely across said vessel to form slots.

6. Apparatus in accordance with claim 4 in which each of said sidewalls is formed as the surface of oppositely disposed truncated cones, and said cones are joined to form said continuous passageways.

7. Apparatus in accordance with claim 4 in which each of said sidewalls is formed as the surface of oppositely disposed truncated pyramids, and said pyramids are joined to form said continuous passageways.

References Cited by the Examiner
UNITED STATES PATENTS

| | | | |
|---|---|---|---|
| 1,932,089 | 10/1933 | Sheeler | 261—121 |
| 2,404,944 | 7/1946 | Brassert | 34—57 |
| 2,417,393 | 3/1947 | Evans. | |
| 2,471,064 | 5/1949 | Hall et al. | |
| 2,471,085 | 5/1949 | Wilcox et al. | |
| 2,581,134 | 1/1952 | Odell | 34—57 |

MORRIS O. WOLK, *Primary Examiner.*

MAURICE A. BRINDISI, *Examiner.*